United States Patent
Ashizawa et al.

(10) Patent No.: US 6,801,288 B1
(45) Date of Patent: Oct. 5, 2004

(54) LIQUID CRYSTAL DISPLAY DEVICE

(75) Inventors: Keiichirou Ashizawa, Mobara (JP); Masuyuki Ota, Mobara (JP); Masayuki Hikiba, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/572,836

(22) Filed: May 16, 2000

(30) Foreign Application Priority Data

May 17, 1999 (JP) ............................................. 11-135260

(51) Int. Cl.[7] .......................................... G02F 1/1333
(52) U.S. Cl. ....................... 349/149; 349/152; 349/43; 349/143
(58) Field of Search ........................... 349/42, 43, 110, 349/111, 149, 151, 152, 51, 143

(56) References Cited

U.S. PATENT DOCUMENTS

| | | | | |
|---|---|---|---|---|
| 5,285,301 A | * | 2/1994 | Shirahashi et al. | ........... 359/59 |
| 5,432,626 A | | 7/1995 | Sasuga et al. | |
| 5,574,582 A | | 11/1996 | Takeda et al. | |
| 5,598,283 A | * | 1/1997 | Fujii et al. | .................. 349/143 |
| 5,598,285 A | | 1/1997 | Kondo et al. | |
| 5,754,266 A | * | 5/1998 | Ohta et al. | .................. 349/139 |
| 5,831,701 A | | 11/1998 | Matsuyama et al. | |
| 6,259,495 B1 | * | 7/2001 | Maeda | ........................ 349/42 |
| 6,310,667 B1 | * | 10/2001 | Nakayoshi et al. | |
| 6,577,371 B2 | * | 6/2003 | Hirabayashi | ................. 349/149 |
| 6,587,160 B2 | * | 7/2003 | Lee et al. | ...................... 349/40 |

FOREIGN PATENT DOCUMENTS

| | | |
|---|---|---|
| JP | 5-257142 | 3/1992 |
| JP | 7-191994 | 12/1993 |
| JP | 9-43589 | 7/1995 |
| JP | 2708098 | 1/1996 |

* cited by examiner

Primary Examiner—Robert H. Kim
Assistant Examiner—Thoi V. Duong
(74) Attorney, Agent, or Firm—Reed Smith LLP; Stanley P. Fisher, Esq.; Juan Carlos A. Marquez, Esq.

(57) ABSTRACT

For preventing light from leaking into pixels located at a periphery of a display region of a liquid crystal display device which has a first conductive layer being extended outside a liquid crystal sealing region formed at an at least one of first and second substrates thereof, an insulating layer covering the first conductive layer, and a terminal contacting the first conductive layer and being extended on the insulating layer at an outside of the display region thereof, a second conductive layer is provided having a different electrical potential from that of the first conductive layer and being formed between the display region and the terminal on the insulating layer.

11 Claims, 9 Drawing Sheets

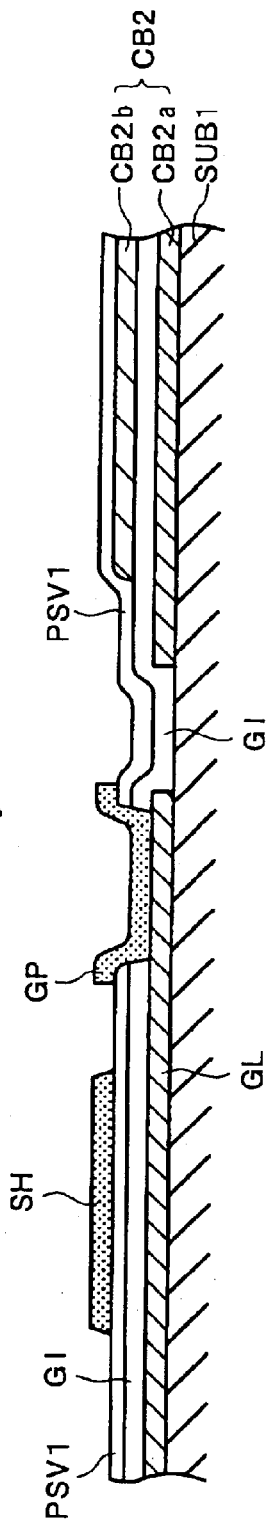
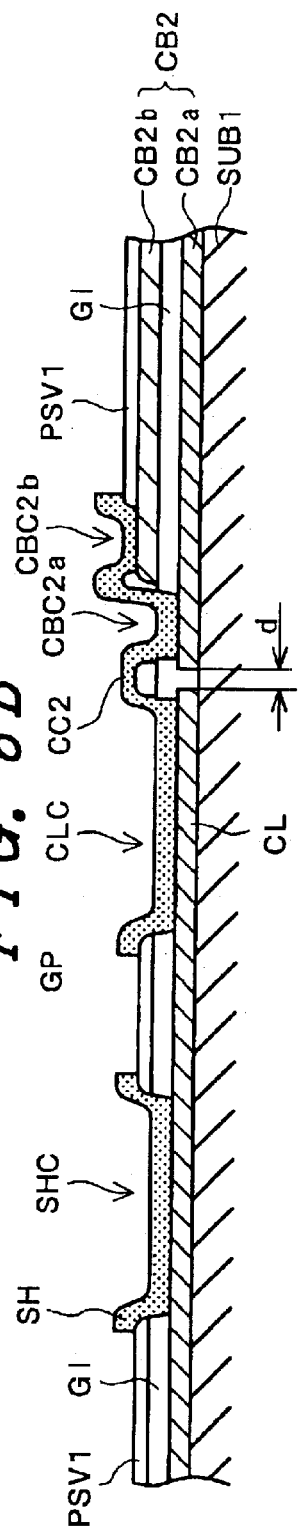
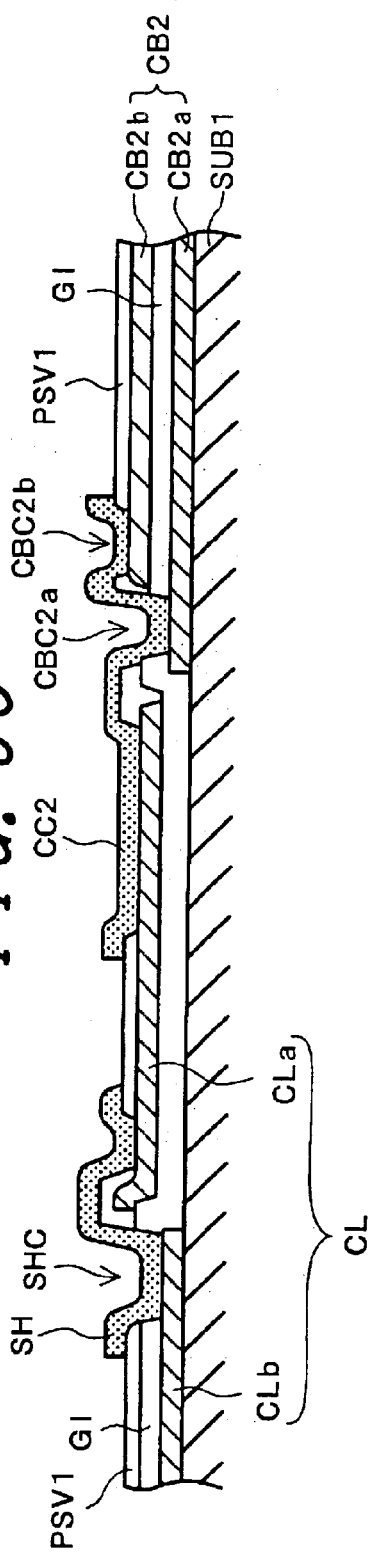

LIQUID CRYSTAL DISPLAY DEVICE

BACKGROUND OF THE INVENTION

1. Field of the Invention

The present invention relates to a liquid crystal display device and, more particularly, to an active matrix type of liquid crystal display device in which a switching element is disposed in each pixel.

2. Description of the Related Art

Liquid crystal display devices are widely used as display devices for various kinds of image display apparatuses. A typical liquid crystal display device includes liquid crystal compounds having liquid crystal molecules which are sealed in the space between two opposite insulating substrates (hereinafter also referred to simply as substrates) at least one of which is transparent, and electrode-selecting pixels formed on either or both of the inside surfaces (main surfaces) of the two insulating substrates. The liquid crystal display device controls the alignment of the liquid crystal molecules by an electric field formed between the pixels, thereby turning on or off transmitted light or reflected light to display an image.

An active matrix type of liquid crystal display device which controls its image display operation by means of switching elements represented by thin film transistors (TFTs) is widely used as a display device for a display terminal such as a computer because of its advantages of small size, light weight and high image quality.

As described above, the active matrix type of liquid crystal device includes the switching elements disposed in the respective pixels, and has a first electrode (pixel electrode) whose potential is controlled by such a switching element, and a second electrode (counter electrode) whose potential variation is small compared to the first electrode. The active matrix type of liquid crystal display device displays an image by controlling the slate of alignment of the liquid crystal molecules which constitute the liquid crystal compounds by means of an electric field generated between these electrodes.

The active matrix liquid crystal display device is classified into two kinds according to the direction of the lines of electric force which is applied to the liquid crystal molecules sealed between the two substrates by the electrodes.

One of the two kinds is a so-called vertical electric field type which has electrodes disposed opposite to each other with a layer of liquid crystal compounds (hereinafter also referred to simply as a liquid crystal layer) being interposed therebetween, and forms an electric field between these electrodes in a vertical direction with respect to the substrate surfaces (refer to, for example, Japanese Patent Laid-Open No. 257142/1993 as well as the corresponding U.S. Pat. No. 5,432,626).

The other kind is a type which has electrodes shifted in position with respect to the liquid crystal layer, and forms an electric field in a direction parallel to the substrate surfaces (refer to, for example, Japanese Patent No. 2,708,098 and U.S. Pat. No. 5,754,266).

The latter type is called an in-plane switching (IPS) type or a lateral electric field type because the alignment of the liquid crystal molecules depends on the lines of electric force generated in the direction of the substrate surfaces.

In one IPS type of liquid crystal display device, as disclosed in the above-cited U.S. Pat. No. 5,754,266, the aforesaid two kinds of electrodes which generate an electric field to control the alignment of liquid crystal molecules are formed on a substrate (TFT substrate) on which thin film transistors (TFTs) are provided. In another IPS type of liquid crystal display device, as disclosed in U.S. Pat. No. 5,598,285, one of the first and second electrodes is formed on a TFT substrate and the other is formed on the other substrate.

In any of the constructions, each of the first and second electrodes has a region which is not opposite to the other, and care is taken that a conductive thin film is not formed particularly on the main surface of the first electrode that is opposite the region (i.e., a surface opposite to the liquid crystal layer). This art is described in Japanese Patent Laid-Open No. 191994/1995 or the like which is the art of reducing the resistance value of a light shielding film, i.e., a black matrix material.

SUMMARY OF THE INVENTION

For such an IPS type of liquid crystal display device, the present inventors formed disconnection testing terminals for gate lines for transmitting control signals to the gate electrodes of thin film transistors (field-effect transistors), by using a conductive material which was called ITO (Indium-Tin-Oxide) in which 1–5 weight % of tin oxide ($SnO_2$) was added to indium oxide ($In_2O_3$).

This material has the advantages of less contamination of a liquid crystal layer due to its constituent elements and less deterioration due to oxidation or the like than metal materials used for related-art test terminals. In addition, the present inventors formed data lines each of which supplied a video signal to the corresponding one of the gate lines and to either one of the source and drain electrodes of the corresponding one of the aforesaid transistors, by using a metal material which was higher in conductivity than ITO.

Each of the test terminals made of ITO was formed in such a manner that a hole (or an opening: a contact hole) is formed to extend through at least two kinds of insulating films, i.e., a gate insulating film which covers the gate lines, and a protective film (called a passivation film) which covers the gate insulating film and the data lines, and the at least two kinds of insulating films are kept in contact with the gate line in the exterior of the hole and are led to the upper portion of the protective film.

In addition, a predetermined space must be set between a portion to which is applied a sealing material for forming a region in which to seal the liquid crystal layer and a display region (a region which actually contributes to image display).

Under such conditions, to meet a demand for narrowing a picture frame, i.e., narrowing the area of a peripheral portion relative to the display region, the test terminals made of the above-described ITO were provided in the liquid crystal sealing region. Accordingly, the test terminals made of the above-described ITO are disposed at locations near the liquid crystal layer.

However, when a liquid crystal display device having the test terminal made of such ITO is activated, the following problem (a first subject) occurs: that is to say, unexpected light leaks occur at pixels positioned at an end of the display region, i.e., even during the state of black display, stripes (bright lines) of a display color occur at the pixels positioned at the end of the display region.

In addition, to stabilize the potential of the second electrode (counter electrode), each counter voltage signal line for distributing a voltage to the counter electrodes of the corresponding pixels is required to conduct to a common line (common bus line) disposed at an end of the substrate.

Since such counter voltage signal lines are formed on the main surface of the substrate that is opposite to the liquid crystal layer, it is necessary that as in the case of the counter electrodes, a gate insulating film, a protective film or an overcoat film be formed on the counter voltage signal lines, and furthermore, an alignment film be formed at positions where the counter voltage signal lines are in contact with the liquid crystal layer. Accordingly, there is a need for the step of covering the counter voltage signal lines with an insulating film.

However, during the formation of the insulating film particularly by CVD (Chemical Vapor Deposition) using plasma, if electric charges generated in the counter voltage signal lines flow into and are stored in the common bus line during the growth of the insulating film, an unexpected electric discharge occurs between this common bus line and the plasma or a plasma-generating electrode.

If a current which is thought of as due to this electric discharge returns to a counter voltage signal line and the resultant electric power exceeds the allowable limit of the counter voltage signal line, the following problem (a second subject) occurs: that is to say, a material (such as chromium) which constitutes the counter voltage signal line melts and short-circuits to an adjacent line, or causes disconnection of the counter voltage signal line itself.

In addition, it is possible to form the pixel electrodes and the counter electrodes of the IPS type of liquid crystal display device from a material other than the above-described ITO. In this case, portions to be used for evaluating the state of deposition of an insulating layer which constitutes the protective film and an ITO film which constitutes the test terminals are limited to contact holes through which to take out the corresponding test terminals from the gate lines.

However, the shapes of these contact holes are designed to have the same dimensions so that disconnection evaluation of each of the gate lines can be performed under as equal conditions as possible. This leads to the problem (a third problem) that data which is to be referred to in the deposition evaluation cannot be obtained only with such contact holes.

An objective of the present invention is to provide a liquid crystal display device which solves the above-described problems (at least one of the first to third subjects) occurring in a case where at least one of the above-described arts is adopted, i.e., the above-described structures of test terminals, the above-described layout of counter voltage signal lines, or the above-described pixel electrodes and counter electrodes made of a material other than ITO.

The representative ones of the liquid crystal display device structures (the LCD structures) according to the present invention for achieving the aforementioned objective are described with respect to each of the aforementioned subjects as follows.

<I. Means for Solving First Subject>

(1) First LCD structure—comprising:
  a liquid crystal sealing region being formed by sealing a liquid crystal compound in a space being interposed by first and second substrates which are disposed so that respective main surfaces thereof are opposite to one another;
  a display region being defined at the liquid crystal sealing region by an opening of a tight shielding film which is formed of a material having a lower optical transmissivity than that of at least one of the first and second substrates on the at least one of the first and second substrates;
  a first conductive layer being formed on at least one of the main surfaces of the first and second substrates in the liquid crystal shielding region so as to be extended from the display region to the exterior thereof;
  an insulating layer being formed over the first conductive layer;
  a terminal being extended on the insulating layer outside the display region and contacting with the first conductive layer; and
  a second conductive layer being formed between the display region and the terminal on the insulating layer,
  wherein an electric potential of the second conductive layer is different from that of the first conductive layer.

(2) Second LCD structure—characterized in that the second conductive layer is formed on the insulating layer covering the first layer covering the first conductive layer, and a length of the second conductive layer along the extension direction of the first conductive layer is greater than a length of the terminal along the extension direction of the first conductive layer, in the First LCD structure.

(3) Third LCD structure—characterized in that
  the first conductive layers are formed of a plurality of conductive layers being juxtaposed and extended outside the display region, and the liquid crystal display device further comprises a third conductive layer being in contact with the second conductive layer through an opening being formed between the plurality of the first conductive layers, in First LCD structure.

(4) Fourth LCD structure—characterized in that a plurality of pixels each of which has a switching element and a pixel electrode are formed on at least one of the main surfaces of the first substrate and the second substrate, and the first conductive layers are in electrical contact with the switching elements respectively, in Third LCD structure.

(5) Fifth LCD structure—characterized in that the switching element is composed by a semiconductor element having a channel being formed along a direction transverse to the extension direction of the first conductive layer,
  a fourth conductive layer is provided on the at least one of the main surfaces of the first and second substrates in the display region and supplies a voltage signal to one end of the channel of the semiconductor element composing the switching element;
  the insulating layer is formed of a first insulating layer and a second insulating layer being formed between an upper surface of the first conductive layer and a lower surface of the fourth conductive layer,
  another end of the channel of the semiconductor element is in electrical contact with the pixel electrode provided at the pixel, and
  the first conductive layer is electrically connected to an electrode for applying an electric field to the channel via the first insulating layer, in Fourth LCD structure.

(6) Sixth LCD structure—characterized in that the third conductive layer is electrically connected with a counter electrode for generating an electric field to be applied to the liquid crystal compound between the counter electrode and the pixel electrode, in Fifth LCD structure.

(7) Seventh LCD structure—characterized in that the terminal and an end of the display region opposite thereto is disposed so as to be spaced from one another with a distance which is four times as long as a pixel region of the pixel along the extension direction of the first conductive layer or longer than the pixel length, in Sixth LCD structure.

(8) Eighth LCD structure—characterized in that the first conductive layer has a portion thereof being with respect to a first extension direction thereof from the display region and extending in a second direction which makes a certain angle to the first extension direction, between a position at which the first conductive layer crosses the second conductive layer and another position the first conductive layer is in contact with the terminal, in Sixth LCD structure.

(9) Ninth LCD structure—characterized in that the first conductive layer has another portion being extended along the first extension direction from an end of the display region being opposite to the terminal to a position at which the portion of the first conductive layer veers in the second extension direction, and a length of the another portion of the first conductive layer along the first extension direction is four times as long as a pixel length of the pixel along the extension direction of the first conductive layer or longer than the pixel length, in Eighth LCD structure.

By adopting any of the above-described first to ninth LCD structures, it is possible to solve the problem that unexpected light leaks occur at pixels positioned at the end of the display region and even during the state of black display, stripes (bright lines) of a display color occur at the pixels positioned at the end of the display region.

<II. Means for Solving Second Subject>

(10) Tenth LCD structure—comprising:
a liquid crystal sealing region being formed by sealing a liquid crystal compound in a space being interposed by first and second substrates which are disposed so that respective main surfaces thereof are opposite to one another;
a display region being defined at the liquid crystal sealing region by an opening of a light shielding film which is formed of a material having a lower optical transmissivity than that of at least one of the first and second substrates on the at least one of the first and second substrates;
a plurality of first conductive layers being formed on at least one of the main surfaces of the first and second substrates in the liquid crystal shielding region so as to be extended from the display region to the exterior thereof;
second conductive layer being extended in a direction transverse to extension directions of the first conductive layers at the exterior of the display region and being formed so as to be spaced from the first conductive layer;
an insulating layer being formed over the first conductive layers and the second conductive layer;
a terminal being extended on the insulating layer outside the display region and contacting with the first conductive layer;
a third conductive layer having a portion which is formed on the insulating layer and has electrical contacts with the first conductive layers and the second conductive layer through openings being formed at the insulating layer outside the display region respectively.

(11) Eleventh LCD structure—characterized in that the insulating layer comprises a first insulating layer and a second insulating layer being formed over the first insulating layer,
the second conductive layer has a first portion being formed under the first insulating layer and a second portion being formed between the first insulating layer and the second insulating layer,
the third conductive layer is in electrical contact with the first portion through openings being formed at the first insulating layer and is in electrical contact with the second portion through an opening being formed at the second insulating layer, in Tenth LCD structure.

(12) Twelfth LCD structure—characterized in that a terminal is provided for the second conductive layer, and the terminal is formed of a conductive material being in electrical contact with the first portion through openings being formed at the first insulating layer and the second insulating layer and being also in electrical contact with the second portion through an opening being formed at the second insulating layer, in Eleventh LCD structure.

(13) Thirteenth LCD structure—characterized in that a fourth conductive layer extending in a direction transverse to the extension direction of the first conductive layer is provided on the insulating layer in an area between the display region and the second conductive layer, and
the fourth conductive layer is in electrical contact with the plurality of first conductive layers through respective openings being formed at the insulating layer, in Eleventh LCD structure.

(14) Fourteenth LCD structure—characterized in that the insulating layer comprises a first insulating layer and a second insulating layer being formed over the first insulating layer, the first conductive layer is separated into a separated portion thereof and another portion thereof between a first position at which the first conductive layer contacts the third conductive layer and a second position at which the first conductive layer contacts with the fourth conductive layer,
the separated portion of the first conductive layer is formed between the first insulating film and the second insulating layer, while the another portion thereof is extended under the first insulating layer from the second position toward the display region, and
the separated portion of the first conductive layer is electrically connected to the another portion thereof by contacting the fourth conductive layer through respective openings being formed at the first and second insulating layers, in Thirteenth LCD structure.

(15) Fifteenth LCD structure—characterized in that a region where the fourth conductive layer is contact with the first conductive layer has a length along the extension direction of the first conductive layer being half as long as a length of the fourth conductive layer along the extension direction of the first conductive layer or longer than the length of the fourth conductive layer, in Thirteenth LCD structure.

(16) Sixteenth LCD structure—characterized in that respective ends of the plurality of first conductive layers being opposite to the second conductive layer are electrically connected to each other by a conductive layer being extended in a direction transverse to the extension direction of the first conductive layers, in Thirteenth LCD structure.

(17) Seventeenth LCD structure—characterized in that the conductive layer being connected to the ends of the plurality of first conductive layers has a length thereof along the extension direction of one of the first conductive layers being smaller than a length of the second conducive layer along the extension direction of one of the first conductive layer, in Fifteenth LCD structure.

(18) Eighteenth LCD structure—characterized in that the opening of the insulating layer through which the second conductive layer and the third conductive layer contacts with one another is extended along the extension direction of the fourth conductive layer extending in a direction transverse to the extension direction of the second conductive layer, and an area where the first conductive layer and the third conductive layer contacts with one another has a length thereof along the extension direction of the first conductive layers being greater than a length of an area where the second conductive layer and the third conductive layer contact with one another along the extension direction of the first conductive layers, in Seventeenth LCD structure.

(19) Nineteenth LCD structure—characterized in that the third and fourth conductive layers are formed of an oxide material lie an ITO, or $SnO_2$.

By adopting any of the tenth to nineteenth LCD structures, it is possible to the problem that during the insulating layer growth by CVD using plasma (Chemical Vapor Deposition) using plasma, an unexpected electric discharge occurs between the common line and the plasma or an electrode for generating the plasma owing to the flow of electric charges generated in counter voltage signal lines into the common line. It is also possible to the problem that if a current due to such an electric discharge returns to a counter voltage signal line, a material which constitutes the counter voltage signal line melts and the counter voltage signal line short-circuits to an adjacent line, or the counter voltage signal line itself is disconnected.

<Ill. Means for Solving Third Subject>

(20) Twentieth LCD structure—comprising:
a liquid crystal sealing region being formed by sealing a liquid crystal compound in a space being interposed by first and second substrates which are disposed so that respective main surfaces thereof are opposite to one another;
a display region being defined at the liquid crystal sealing region by an opening of a light shielding film which is formed of a material having a lower optical transmissivity than that of at least one of the first and second substrates on the at least one of the first and second substrates;
a plurality of first conductive layers being juxtaposed in the display region and extended along a first direction,
a first insulating layer being formed over the first conductive layers and the second conductive layers;
a plurality of second conductive layers being juxtaposed over the first insulating layer in the display region and extended along a second direction transverse to the first direction;
a pixel being disposed in a region surrounded by a pair of the first conductive layers and a pair of the second conductive layers in the display region;
a second insulating layer being formed over the second conducive layers; and
a third conductive layer having a portion being formed on the second insulating layer at the exterior of the display region;
wherein at least one of the first conductive layers and the second conductive layers is extended to the exterior of the display region and is contacted with the portion of the third conductive layer through an opening formed through the first and second insulating layers at the exterior of the display region,
wherein a fourth conductive layer is formed under the first insulating layer and a fifth conductive layer is formed between the first and second insulating layers respectively at the exterior of the display region,
wherein a first opening down to an upper surface of the fourth conductive layer is provided in the first and second insulating layers, a second opening down to an upper surface of the fifth conductive layer is provided in the second insulating layer so as to be spaced from the first opening, and a sixth conductive layer is formed on the second insulating layer so as to surround the first opening and the second opening and so as to extend into insides of the first opening and the second opening,
wherein the third conductive layer and the sixth conductive layer are formed of a conductive material having optical transmissivity higher than that of the fourth conductive layer and the fifth conductive layer.

(21) Twenty-First LCD structure—characterized in that the sixth conductive layer being formed at the first opening and the sixth conductive layer being formed at the second opening are spaced from one another on the second insulating layer, in the

(22) Twenty-Second LCD structure—characterized in that both the fourth conductive layer and the fifth conductive layer are electrically isolated (insulated) from the first, second and third conductive layers, in Twentieth LCD structure.

(23) Twenty-Third LCD structure—characterized in that the third and sixth conductive layers are formed of an oxide material like an ITO, or $SnO_2$, in Twentieth LCD structure.

By adopting any of the twentieth to twenty-third LCD structures, disconnection evaluation of each gate line is enabled.

In addition, the following structures are available as combinations of the structures which have been described above as the means for solving any of the first to third subjects.

(24) Twenty-Fourth LCD structure—characterized in that the second conductive layer in the means for solving the first subject is used also as the fourth embodiment in the means for solving the second subject.

(25) Twenty-Fifth LCD structure—characterized in that the terminal in the means for solving the first subject is provided on a side nearer to the display region than is the second conductive layer in the means for solving the second subject, and is connected to ends of the plurality of first conductive layers in the means for solving the second subject and is provided on a side nearer to the display region than is the conductive layer extended along the second conductive layer.

(26) Another LCD structure—characterized in that the display region in the means for solving the first subject is defined by a side, nearer to the display region, of the one of the fourth conductive layers that is disposed nearest to the end of the display region, or by an edge of the opening formed in the light shielding material, the edge being nearest to the end of the display region.

(27) Another LCD structure—characterized in that the first and second openings in the means for solving the third subject are provided at a position opposite to the end of the second conductive layer in the means for solving the first subject or the fourth conductive layer in the means for solving the second subject.

Incidentally, the present invention is not limited to any of the above-described structures and the structures of embodiments which will be described below, and it goes without saying that various modifications can be made without departing from the technical ideas of the present invention.

These and other objects, features and advantages of the present invention will become more apparent from the following description when taken in conjunction with the accompanying drawings.

BRIEF DESCRIPTION OF THE DRAWINGS

FIGS. 8A, 8B and 8C are cross-sectional views of the essential portion of the structure shown in FIG. 7;

DETAILED DESCRIPTION

An embodiment of the present invention will be described below in detail with reference to drawings of the embodiment which shows an IPS type of active matrix liquid crystal display device by way of example.

<<Plane Construction of Display Region (as Viewed from the Center of Pixel)>>

Figure 1:
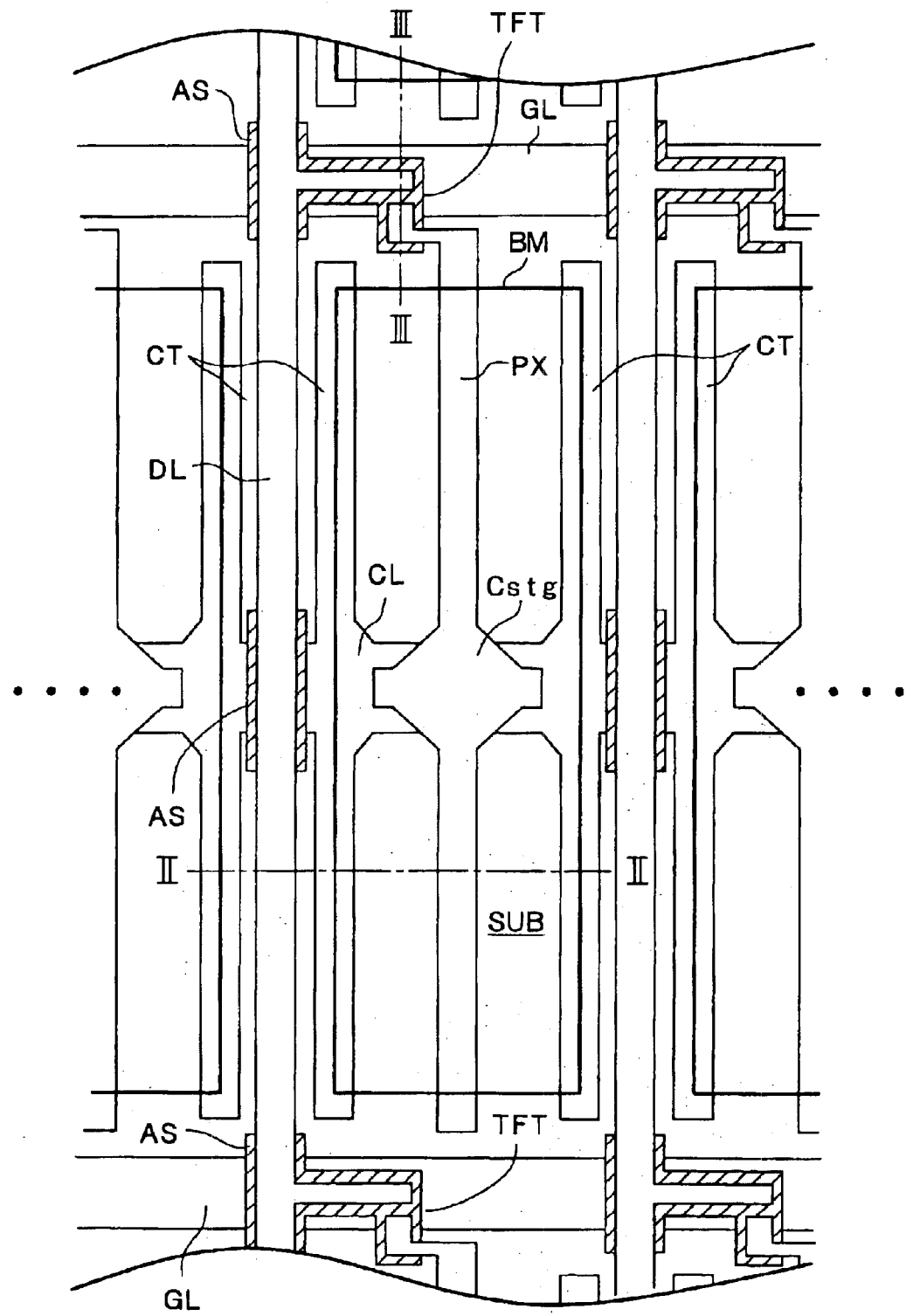
FIG. 1 is a diagrammatic plan view illustrating one pixel and a surrounding portion of an active matrix type of color liquid crystal display device to which the present invention is applied.

FIG. 1 is a diagrammatic plan view illustrating one pixel and a surrounding portion of an active matrix type of color liquid crystal display device to which the present invention is applied. In FIG. 1, a black matrix BM is shown by the edge of an opening, and one pixel is formed in this opening portion.

In FIG. 1, each pixel is disposed in a region of intersection of a gate signal line (a scanning signal line or a horizontal signal line) GL, a counter voltage signal line (a counter electrode interconnection line) CL and two adjacent data signal lines (video signal lines, drain signal lines or vertical signal lines) DL, i.e., in a region surrounded by these four signal lines.

Each pixel includes a thin film transistor TFT, a storage capacitance Cstg, a pixel electrode PX and a counter electrode CT. Each of the gate signal line GL and the counter voltage signal line CL is formed to be extended in the lateral direction as viewed in FIG. 1, and a plurality of gate signal lines GL and a plurality of counter voltage signal lines CL are disposed in the vertical direction as viewed in FIG. 1.

The pixel electrode PX is connected to the thin film transistor TFT which serves as a switching element for switching a voltage to be applied to the pixel electrode PX, and the counter electrode CT is formed integrally with the counter voltage signal line CL.

The pixel electrode PX and the counter electrode CT are opposite to each other, and the optical state of a liquid crystal LC (refer to FIG. 2) is controlled by an electric field which is generated between each of the pixel electrode PX and the corresponding ones of the counter electrodes CT, thereby controlling a display. The pixel electrodes PX and the counter electrodes CT are constructed in a comb-teeth like form, and each of the pixel electrodes PX and the counter electrodes CT is formed as an electrode which is elongated in the vertical direction as viewed in FIG. 1.

As is apparent from FIG. 1, a pixel region which is surrounded by a pair of gate signal lines GL and a pair of data signal lines DL is formed so that its sides extending along the data signal lines DL are longer than its sides extending along the gate signal lines GL.

<<Cross-Sectional Construction of Display Region>>

Figure 2:
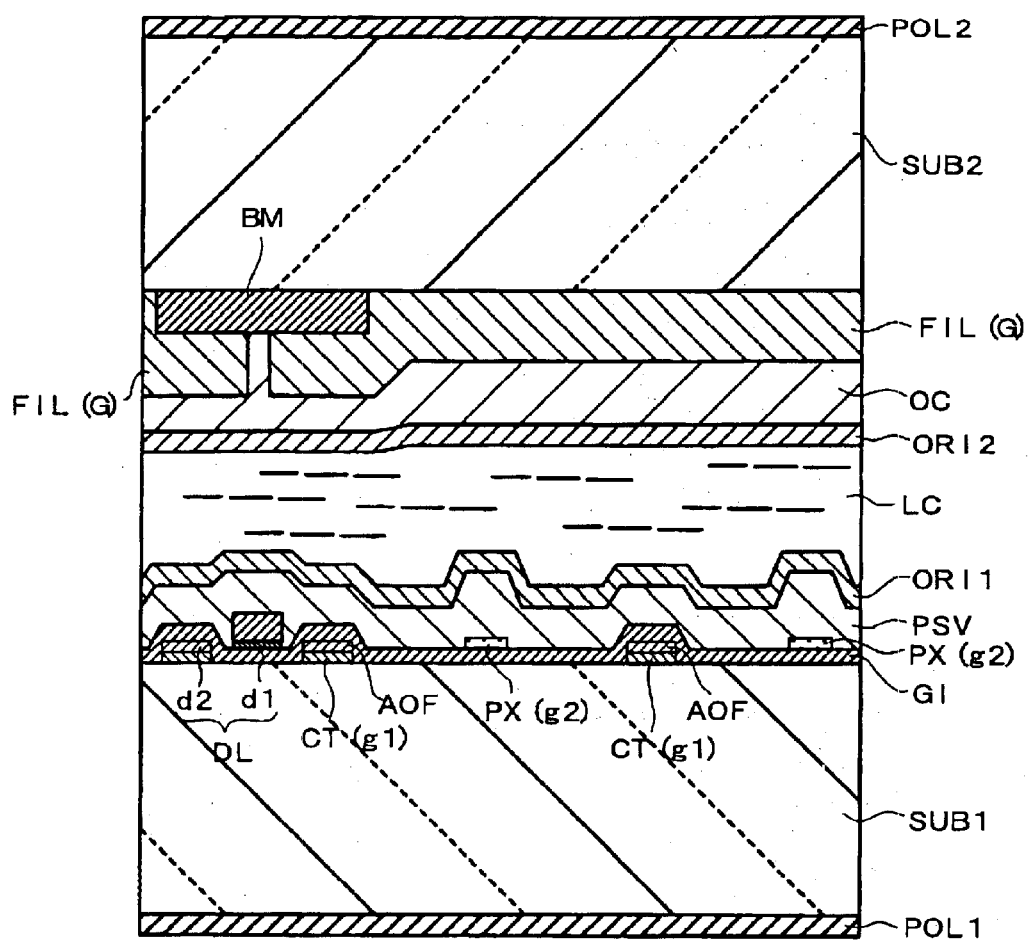
FIG. 2 is a cross-sectional view taken along line II—II of FIG. 1, showing the vicinity of the pixel.
Figure 3:
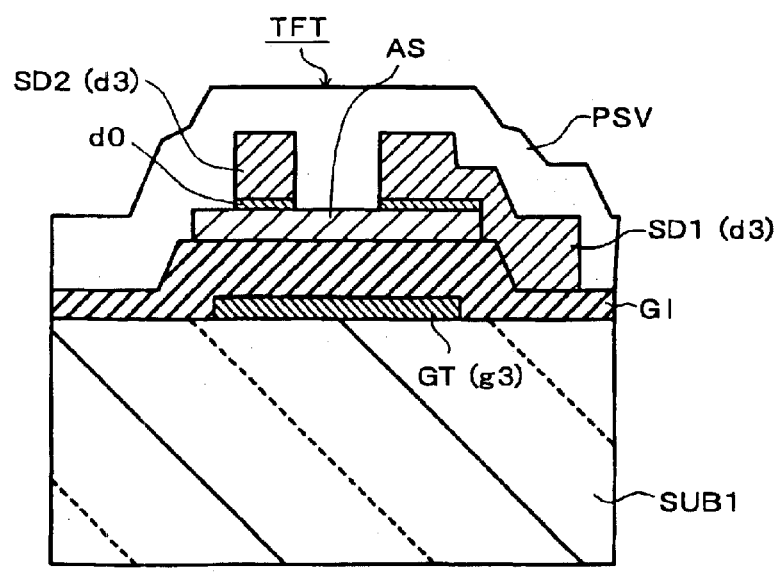
FIG. 3 is a cross-sectional view taken along line III—III of FIG. 3, showing the vicinity of the pixel.

FIG. 2 is a cross-sectional view taken along line II—II of FIG. 1, and FIG. 3 is a cross-sectional view taken along line III—III of FIG. 1. The thin film transistor TFT, the storage capacitance Cstg and other electrodes are formed on a lower transparent glass substrate SUB1 which underlies the liquid crystal layer LC, and the pattern of the black matrix BM which is a light shielding film formed of a material having a lower optical transmissivity than the materials of a color filter FIL, the glass substrate and the like is formed on an upper transparent glass substrate SUB2 which overlies the liquid crystal layer LC.

Orientation films ORI1 and ORI2 which control the initial orientation of the liquid crystal layer LC are respectively provided over the inside surfaces (the liquid-crystal-LC-side surfaces, i.e., the main surfaces) of the transparent glass substrates SUB1 and SUB2. Polarizers POL1 and POL2 which are arranged so that their polarizing axes are perpendicular to each other (crossed-Nicols arrangement) are respectively provided over the outside surfaces of the transparent glass substrates SUB1 and SUB2.

The details of the thin film transistor TFT and the storage capacitance Cstg are illustrated in cross section in, for example, the above-cited U.S. Pat. No. 5,598,285.

In the construction of the embodiment shown in FIGS. 1 and 2, the gate signal line GL is made of a conductive film g1. The conductive film g1 of this gate signal line GL is formed by the same manufacturing process as a conductive film g3 of a gate electrode GT; and is constructed integrally with the conductive film g3. A gate voltage Vg is supplied to the gate electrode GT from an external circuit via this gate signal line GL.

In the construction shown in FIG. 2, the gate signal line GL is formed of aluminum (Al), and an anodized film (an anodic oxidation film) AOF of aluminum is provided on the gate signal line GL.

Incidentally, the material of the gate signal line GL is not limited to aluminum (Al), and may also use chromium (Cr), a stacked layer of chromium (Cr) and a chromium-molybdenum (Cr—Mo) alloy, or a single or multiple layer of other metals or alloy materials. Whether to form the anodic oxidation film AOF may be determined by what kind of material is to be selected for the gate signal line GL. The gate signal line GL is formed together with the gate electrode GT of the thin film transistor TFT.

The counter electrode (common electrode) CT is made of the conductive film g1 which is the same layer as the gate electrode GT and the gate signal line GL Moreover, the anodic oxidation film AOF of aluminum (Al) is provided on the counter electrode CT. As in the case of the above-described gate signal line GL, the material of the anodic oxidation film AOF may be arbitrarily changed, and the anodic oxidation film AOF may also not be formed. In the case of the present embodiment, since the counter electrode CT is covered with the anodic oxidation film AOF, the probability of short-circuiting the data signal line DL and the counter electrode CT can be reduced even if the counter electrode CT are made closer to the data signal line DL. The data signal line DL and the counter electrode CT can also be arranged to intersect with each other.

The counter voltage signal line CL is also made of the conductive film g1. In the present embodiment, the conductive film g1 of the counter voltage signal line CL is formed by the same manufacturing process as the conductive film g3 of each of the gate electrode GT, the gate signal line GL and the counter electrode CT, and the counter voltage signal line CL is integral with the counter electrode CT.

The potential of the counter electrode CT is kept approximately stable by a voltage to be supplied from an external circuit via the counter voltage signal line CL. In the present embodiment, the anodic oxidation film AOF of the aluminum (Al) is also provided on the counter voltage signal line CL, and the necessity and advantage of the anodic oxidation film AOF are as described above in connection with the gate signal line GL and the counter electrode CT.

An insulating film GI is used as a gate insulating film for applying an electric field to a semiconductor layer AS (which will be described later) from the gate electrode GT in the thin film transistor TFT. In the process of fabricating a display region, the insulating film GI is formed on not only the gate electrode GT but also the gate signal line GL.

The insulating film GI is made of, for example, a silicon nitride film (SiN) formed by plasma CVD, and is formed to have a thickness of 1200–2700 Å (in the present embodiment, approximately 2400 Å). The gate insulating film GI is formed over the whole of a display region AR, and peripheral portions of the insulating film GI are removed to expose external connecting terminals Td and Tg which will be described later. In addition, the insulating film GI contributes to the electrical insulation between the data signal line DL and the gate signal Line GL as well as the counter voltage signal line CL.

The i-type semiconductor layer AS made of amorphous silicon is formed to have a thickness of 200–2200 Å (in the present embodiment, a thickness of approximately 2000 Å). In the thin film transistor TFT, the i-type semiconductor layer AS constitutes a channel of a field-effect transistor.

An $N^+$-type amorphous semiconductor layer d0 doped with phosphorus (P) is formed on the i-type semiconductor layer AS to provide ohmic contact with a separated portion of the data signal line DL made of a metal or an alloy material which will be described later, thereby enabling carriers (electrons or holes) to easily flow into the i-type semiconductor layer AS. The $N^+$-type amorphous semiconductor layer d0 is separated into a source side and a drain side in the channel region of the i-type semiconductor layer AS to which an electric field is to be applied from the gate electrode GT.

Formed above the insulating film GI are the data signal line DL, a drain electrode separated from the data signal line DL and extended into the thin film transistor TFT, a source electrode which is opposite to the drain electrode on the channel, and a pixel electrode connected to the source electrode.

The definitions of the source electrode and the drain electrode depend on the operating conditions of the thin film transistor TFT, and there is also a case where the drain electrode separated from the data signal line DL and extended into the thin film transistor TFT functions as a source electrode, while the source electrode opposite to the drain electrode functions as a drain electrode. However, in the following description, for the sake of convenience, the respective electrodes which constitute the thin film transistor TFT will be termed as described above.

In the embodiment shown in FIGS. 1 to 3, the data signal line DL, the drain electrode, the source electrode and the pixel electrode PX can also be formed by the same process. The data signal line DL is formed on the gate insulating film GI or on the i-type semiconductor layer AS formed thereon. Unlike the data signal DL, the drain electrode and the source electrode are formed on the $N^+$-type amorphous semiconductor layer d0 formed on the i-type semiconductor layer AS. The data signal line DL is formed by stacking the conductive film d1 made of a 500-to-1000-Å-thick chromium (Cr) film formed by sputtering and the conductive film d2 made of an aluminum (Al) film.

The first conductive film d1 may also use, in addition to a chromium (Cr) film, a high melting point metal (Mo, Ti, Ta or W) film or a high melting point metal silicide ($MOSi_2$, $TiSi_2$, $TaSi_2$ or $WSi_2$) film.

Figure 5:
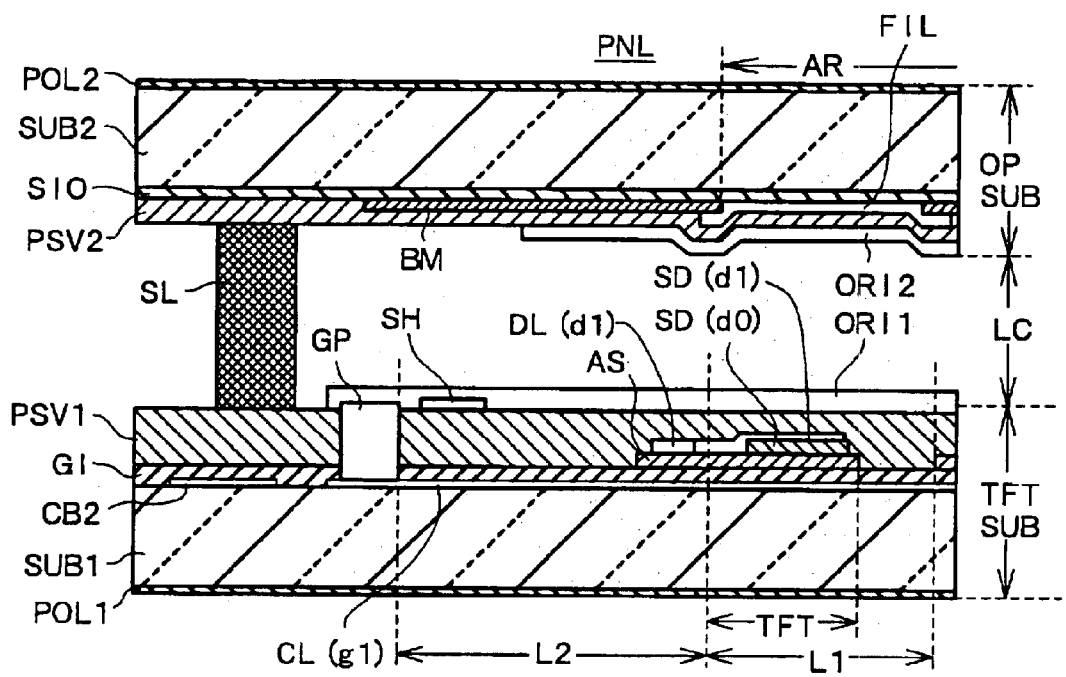
FIG. 5 is a cross-sectional view showing the vicinity of the vicinity of a sealing portion of an edge portion of a liquid crystal panel.

The conductive film d2 is formed to have a thickness of 3000–5000 Å (in the present embodiment, approximately 4000 Å) by sputtering of Al. As compared with the Cr film, the Al film is small in stress and can be formed to have a large thickness, and acts to reduce the resistance value of each of a source electrode SD1, a drain electrode SD2 and the data signal line DL as well as to ensure (improve) a step coverage due to the gate electrode GT or the i-type semiconductor layer AS. Any of the data signal line DL, the drain electrode, the source electrode and the pixel electrode PX can also be formed of a single-layer metal film like the gate signal line GL made of only the first conductive film d1. FIG. 5 which will be referred to later shows an example in which the data signal line DL and a drain electrode SD of the thin film transistor TFT which is separated from the data signal line DL is formed of a single-layer metal film.

The pixel electrode PX is formed on the insulating film GI formed on the counter voltage signal line CL. The superposition of the pixel electrode PX and the counter voltage signal line CL constitutes the storage capacitance (electrostatic capacity element) Cstg.

As shown in FIG. 5, a protective film (passivation film) PSV1 is formed over the data signal line DL (d1), the drain electrode, the source electrode and the pixel electrode PX. The protective film PSV1 is made of an insulative material such as silicon nitride. The orientation film ORI1 made of an organic material such as polyimide is formed on the protective film PSV1.

<<Construction of Peripheral Portion of Display Region>>

Figure 4:
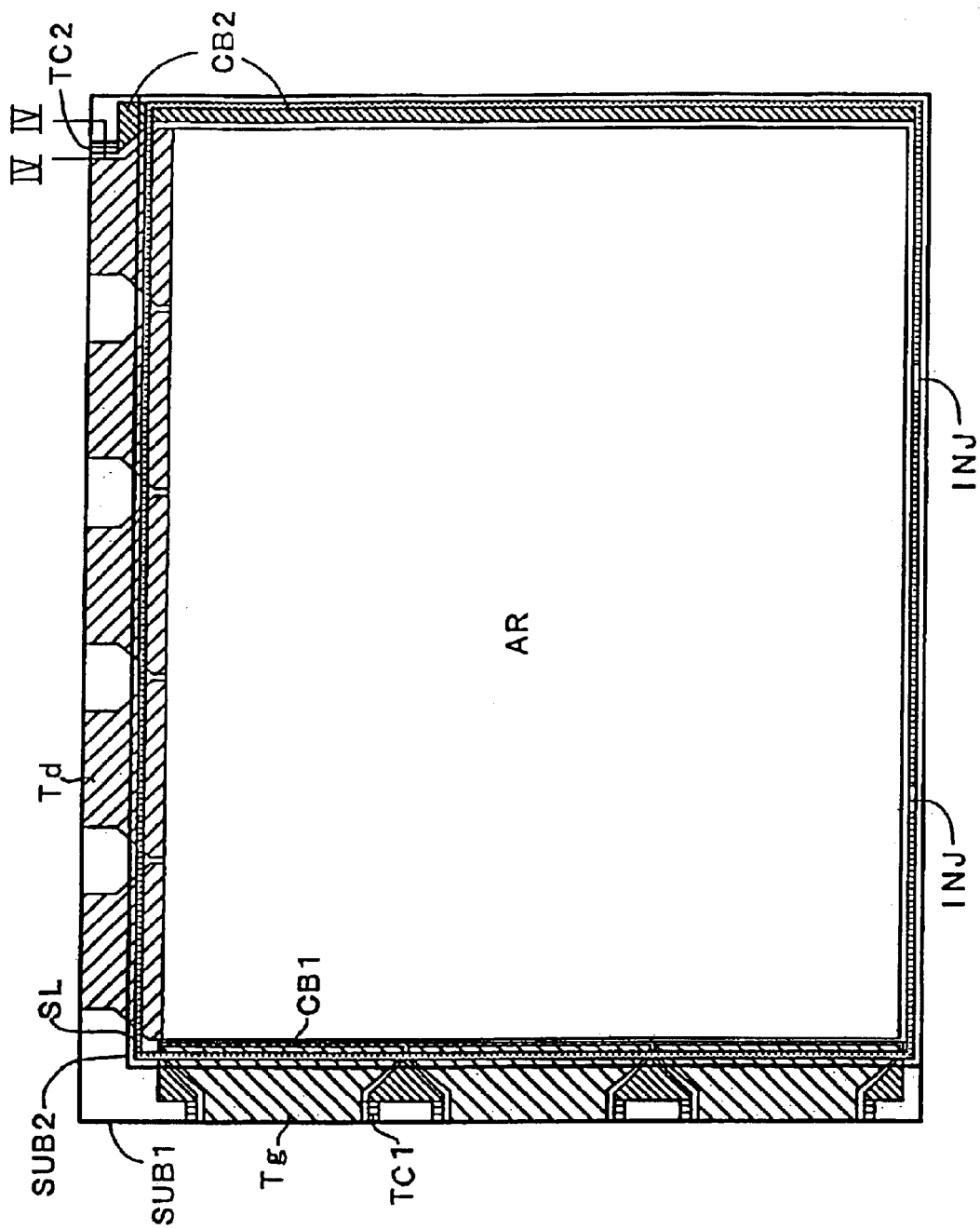
FIG. 4 is a plan view showing a peripheral portion of a display region of a display panel which includes lower and upper transparent glass substrates.

FIG. 4 is a plan view showing a peripheral portion of an region (AR) (which is called a display region or a matrix) of a display panel PNL which includes the lower and upper transparent glass substrates (the lower transparent glass substrate and the upper transparent glass substrates; hereinafter also referred to simply as the lower substrate and the upper substrate) SUB2 and SUB1. FIG. 5 is a cross-sectional view showing the vicinity of a sealing portion of a panel edge portion in which a counter voltage bus line CB2 and a test terminal GP for the gate signal line GL are arranged on the left side as viewed in FIG. 5. The counter voltage bus line CB2 is electrically connected to a plurality of counter voltage signal lines CT for the purpose of stabilizing the potentials thereof. In FIG. 5, the side of the lower substrate SUB1 on which the thin film transistors TFT and various other electrodes and terminals are formed is denoted by TFTSUB, while the side of the upper substrate SUB2 on which the color filter FIL and the black matrix BM are formed is denoted by OPSUB.

In the manufacture of panels of this type, if small-sized panels are to be manufactured, for the purpose of increasing throughput, a plurality of devices (panel components) are fabricated on one glass substrate at the same time and the glass substrate is divided into the individual devices. If large-sized panels are to be manufactured, even in the case of any kind of article, a standard-sized glass substrate is processed and is then reduced to a size suited to the kind of article, for the purpose of enabling manufacture of various kinds of articles by using common manufacturing facilities. In either case, after a series of processes have been completed, the glass is cut.

Both of FIGS. 4 and 5 show an example of the latter case, and represent the lower and upper glass substrates SUB1 and SUB2 which are already cut. In either of the above-described cases, when the liquid crystal panel PNL is completed, connecting terminal groups Tg for providing connection between the corresponding gate signal lines GL and the external circuit, connecting terminal groups Td for providing connection between the corresponding data signal lines DL and the external circuit, and terminals (counter electrode terminals) TC1 and TC2 for applying potentials to the counter voltage signal lines CT are located in a portion of the liquid crystal panel PNL (the top and left sides of the liquid crystal panel PNL as viewed in FIG. 4). The size of the upper substrate SUB2 is made smaller than that of the substrate SUB1 so that the upper substrate SUB2 is set back from the substrate SUB1 to expose the terminal groups Tg and Td and the terminals TC1 and TC2 in that portion.

Each of the shown terminal groups Tg and Td includes a tape carrier package on which an integrated circuit chip is mounted, and a plurality of gate signal supplying circuit connecting terminals (in each of the terminal groups Tg) or a plurality of data signal supplying circuit connecting terminals (in each of the terminal groups Td) and a plurality of corresponding lead line portions are assembled for each tape carrier package. The method of mounting this integrated circuit chip is described in detail in, for example, the above-cited U.S. Pat. No. 5,598,285.

The lead lines of each of the terminals Tg and Td extend from a matrix portion to an external connecting terminal portion, and are arranged so that the inclinations of the lead lines gradually become larger toward each of the outermost lead lines. This arrangement is intended to adjust the difference between the line pitch and the connecting terminal pitch of each of the tape carrier packages and the pitch of the data signal fines DL or the gate signal lines GL of the liquid crystal panel PNL.

The counter electrode terminals TC1 and TC2 are terminals for applying a counter voltage to the counter electrodes CT. The counter voltage signal lines CL are led out from the display region AR on the side of the terminals Tg for gate signal supplying circuits as well as on the opposite side (on the right and left sides as viewed in FIG. 4). The counter voltage signal lines CL are connected to counter electrode terminals CTM in an integrated form by each common bus line CB (CB1 and CB2).

A frame of a sealing material SL made of an epoxy resin or the like is formed to extend between the transparent glass substrates SUB1 and SUB2 along the entire edge of each of the transparent glass substrates SUB1 and SUB2 except liquid crystal filling ports INJ. The layer LC of a liquid crystal material (or liquid crystal layer LC) is scaled in the space inside the frame (refer to the right side of FIG. 5); that is to say, this space constitutes a liquid crystal sealed area.

The layers of the respective orientation films ORI1 and ORI2 are formed inside the liquid crystal sealed area. The orientation film ORI1 is formed on the protective film PSV1 which is formed over the main surface of the lower transparent glass substrate SUB1 that faces the liquid crystal layer LC.

The polarizers POL1 and POL2 are respectively arranged on the outside surfaces of the lower transparent glass substrate SUB1 and the upper transparent glass substrate SUB2 (the surfaces of the substrates SUB1 and SUB2 that do not face the liquid crystal sealed area).

In the assembly of this liquid crystal display device, various kinds of layers are stacked on each individual one of the lower transparent glass substrate SUB1 and the upper transparent glass substrate SUB2, and a frame-shaped pattern for the sealing material SL is formed over the upper transparent glass substrate SUB2. The lower transparent glass substrate SUB1 and the upper transparent glass substrate SUB2 are superposed on each other, and after the liquid crystal material has been injected through the openings INJ of the sealing material SL, the filling ports INJ are sealed with an epoxy resin or the like and the lower and upper substrates SUB1 and SUB2 are cut. Thus, the liquid crystal display device is assembled. The liquid crystal material is sealed in the space inside the sealing material SL that constitutes the liquid crystal sealed area.

<<Details of Embodiment>>

Figure 6:
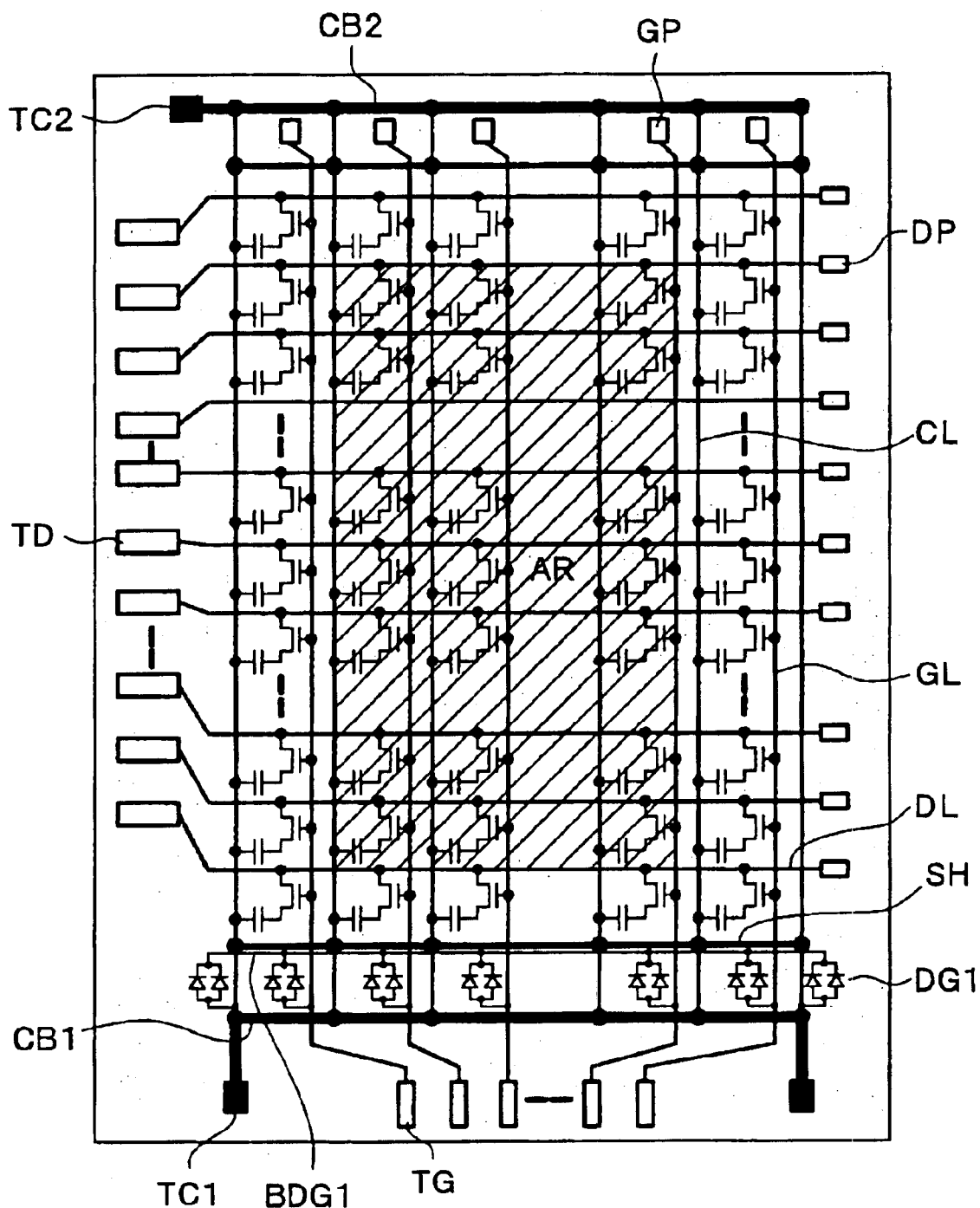
FIG. 6 is a schematic view diagrammatically showing the circuit construction of an active matrix liquid crystal display device formed on the lower glass substrate.

FIG. 6 is a schematic view diagrammatically showing the circuit construction of an active matrix liquid crystal display device formed on the lower glass substrate SUB1. A plurality of pixels are disposed, and have thin film transistors, respectively, in spaces each of which is surrounded by two gate signal lines GL extended along the longer sides of the lower glass substrate SUB1 and by two data signal lines DL extended along the shorter sides of the lower glass substrate SUB1. The symbol of the capacity shown in each of the pixels denotes a pixel electrode and a counter electrode which are opposite to each other with the liquid crystal layer interposed therebetween.

From among the shown plurality of pixels, the pixels which are located in a hatched portion of FIG. 6 are those disposed in the display region AR. Pixels which surround those pixels are dummy pixels which are disposed at the exterior of the display region AR and do not contribute to image display.

The gate signal lines GL disposed in the display region AR as well as the counter voltage signal lines CL and the data signal lines DL all of which are extended along the respective gate signal lines GL are formed to be extended into the exterior of the display region AR.

The extended line portion of each of the gate signal lines GL that is extended outward from one side of the display region AR is provided with a connecting terminal TG for connection to a gate signal supplying circuit provided in the exterior of the liquid crystal panel PNL. The extended line portion of each of the gate signal lines GL that is extended outward from the other side of the display region AR is provided with the test terminal GP for testing the state of connection of the corresponding gate signal line GL.

The extended line portion of each of the data signal lines DL that is extended outward from one side of the display region AR is provided with a connecting terminal TD for connection to a data signal supplying circuit provided in the exterior of the liquid crystal panel PNL. The extended line portion of each of the data signal lines DL that is extended outward from the other side of the display region AR is provided with a test terminal DP for testing the state of connection of the corresponding data signal line DL.

The plurality of counter voltage signal lines CL are connected to the counter voltage bus line (common bus line) CB1 at their line portions extended outward from one end of the display region AR, and to the counter voltage bus line CB2 at their line portions extended outward from the other end of the display region AR.

The counter voltage bus line CB1 is connected to a power supply circuit provided in the exterior of the liquid crystal panel PNL, via the counter electrode terminal TC1 formed on the side of one end of the display region AR and via the counter electrode terminal TC2 formed on the side of the other end of the display region AR. The counter voltage bus line CB1 keeps stable the potential of the counter electrode CT (refer to FIG. 1) of each pixel formed on the liquid crystal panel PNL.

Figure 7:
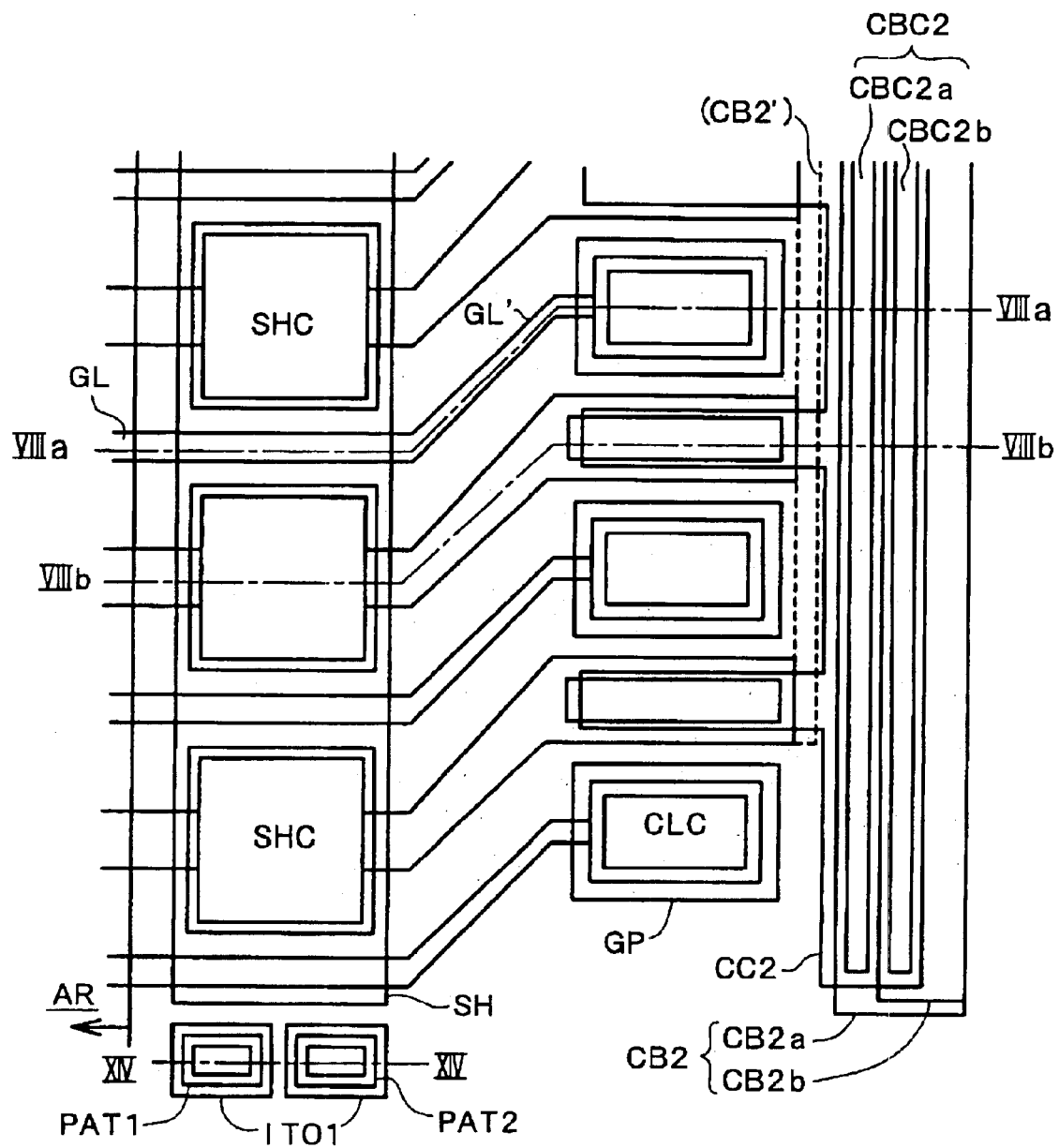
FIG. 7 is a plan view illustrating the structure of each test terminal for a gate signal line which extends into the exterior of a display region AR.

A FIG. 7 is a plan view of the structure of each of the test terminals GP for the gate signal lines GL, and FIGS. 8A, 8B and 8C are cross-sectional views of the essential portion of the structure shown in Fig. 7, FIG. 8A is a cross-sectional view taken along line VIIIa—VIIIa of FIG. 7, and FIGS. 8B and 8C are cross-sectional views taken along line VIIIb—VIIIb of FIG. 7.

As shown in FIG. 8A, the test terminal GP has a shape which extends from a portion disposed in contact with the gate signal line GL in an opening formed in the gate insulating film GI formed on the gate signal line GL, to a portion formed on the gate insulating film GI. Accordingly, since the test terminal GP is disposed near the liquid crystal layer LC, the influence of residual charges or the like on the liquid crystal layer LC cannot be ignored (the occurrence of light leak into the display region AR).

In the present embodiment, to cope with the influence of residual charges or the like, a conductive layer SH is newly provided on the gate insulating film GI between the display region AR and the test terminal GP (FIG. 8A). This conductive layer is hereinafter called a shield electrode for the sake of convenience. An external circuit is connected to this shield electrode SH so that the potential of the shield electrode SH can vary with respect to the potential of the gate insulating film GI, whereby the previously described first subject (unexpected light leak into the display area) is nearly solved. If the residual charges are considered to be the cause of the light leak, it can be considered that since a voltage source other than the gate signal line GL is connected to the shield electrode SH, the lines of electric force formed by the residual charges are prevented from reaching the display region AR and are nearly terminated at the shield electrode SH.

If the shield electrode SH is extended on the gate insulating film GI which covers the gate signal line GL, the extension of unexpected emission (exit light) from the test terminal GP toward the display region AR along the gate signal line GL is restrained.

As the dimension of the shield electrode SH along the extension direction of the gate signal line GL is made longer than that of the test terminal GP, the light leak is restrained more.

In a case where a plurality of gate signal lines GL and counter voltage signal lines CL or conductive layers connected to a circuit system different from the gate signal lines GL are alternately disposed on the main surface of the lower glass substrate SUB1, an opening which reaches the upper face of each of the counter voltage signal lines CL may be formed in the insulating film GI as shown in FIG. 8B so that the shield electrode SH and the counter voltage signal line CL are brought into contact with each other. This construction can restrain the charge-up of the shield electrode SH itself In addition, in the case where the shield electrode SH is connected to a line, such as the counter voltage signal line CL, which is smaller in potential variation than the gate signal line GL, the light leak can be reliably prevented.

This shield electrode SH is usefully applied to a liquid crystal display device which the test terminals GP like the test terminal GP shown in FIG. 8A are provided on the gate signal lines GL or the data signal lines DL.

Since the sides of each of the pixels along the gate signal lines GL are shorter than those along the data signal lines DL, light leak cannot be completely solved with respect to the test terminals TG of the gate signal lines GL even if dummy pixels are disposed in the neighborhood of the display region AR. In this case, the shield electrode SH has a remarkable effect on the test terminal GP of the gate signal line GL.

In addition, in the IPS type of liquid crystal display device in which the counter voltage signal lines CL are disposed along the gate signal lines GL, since a construction such as that shown in FIG. 8B can be adopted, the effect of the shield electrode SH becomes large.

In embodying the present invention, the distance (L2 in FIG. 5) between the test terminal GP of the gate signal line GL and the end of the display region AR that is opposite to the test terminal GP is preferably set to a distance which is four or more times the length of one pixel along the extension direction of the gate signal line GL, i.e., a separation distance which is greater than or equal to the total length of unit pixels of three colors which constitute one pixel.

The definition of each of the ends of the display region AR may be made on the basis of the pixel-region-side edge of a data signal line DL which is positioned on the substrate-edge side of the pixels which are located along each of the ends of the display region AR, or on the basis of the edges of the openings of the light shielding film (black matrix) BM, which edges are closest to the edges of the substrates. (The difference between these reference settings is within an error range.)

The pitches of the gate signal lines GL and the data signal lines DL at the exterior of the display region AR are made equal to the pitch of the test terminals GP. If the pitches of the gate signal lines GL and the data signal lines DL inside the display region AR differ from the pitch of the test terminals GP, portions (indicated by GL' in FIG. 7) are formed in the gate signal lines GL or the data signal lines DL, respectively. Each of the portions GL' is bent at the exterior of the display region AR at a predetermined angle with respect to the extension direction, within the display region AR, of the corresponding one of the gate signal lines GL or the data signal lines DL. In this case, the light leaks at the respective test terminals GP also become remarkable in the bent portions GL'. This problem is also solved with the shield electrode SH.

To restrain light leaks from the bent portions GL', the distance from the end of the display region AR to each of the bent portions GL' is preferably made four or more times the length of one pixel along the extension direction of the gate signal line GL, as described above.

The test terminals GP and the shield electrode SH are preferably formed of an oxide material (such as ITO or tin oxide) having conductivity. In a case where the test terminals GP and the shield electrode SH are disposed near the liquid crystal layer, there is no risk of contamination of the liquid crystal layer as compared with metal layers.

The plurality of counter voltage signal lines CL extend into the exterior of the display region AR, and each of the counter voltage signal lines CL has, at the exterior of the display region AR, the counter voltage bus line CB2 which extends in a direction transverse to the extension direction of each of the counter voltage signal lines CL and is formed to be spaced apart therefrom, the gate insulating film GI and the protective film PSV1 which are formed over these conductive layers, and a conductive layer CC2 which is in contact with each of the counter voltage signal lines CL and the counter voltage bus line CB2 through openings CLC and CBC2 (CBC2a and CB2b) provided in the gate insulating film GI and the protective film PSV1 at the exterior of the display region AR, and which has a portion formed on the protective film PSV1.

During the formation of the gate insulating film GI and the protective film PSV1, the plurality of counter voltage signal lines CL and the counter voltage bus line CB2 are spaced apart from each other. After the gate insulating film GI and the protective film PSV1 have been formed over the counter voltage signal lines CL and the counter voltage bus line CB2, openings which reach the respective conductive layers are formed in these insulating material layers, and the conductive layer CC2 which is in contact with each of the counter voltage signal lines CL through one opening is extended into the other opening over the upper face of the protective film PSV1 and is brought into contact with the counter voltage bus line CB2.

Owing to this construction, during the formation of the gate insulating film GI and the protective film PSV1, charges (static electricity) which occur in the respective counter voltage signal lines CL are prevented from entering the counter voltage bus line CB2.

No excessive charges are stored in the counter voltage bus line CB2, whereby particularly when the gate insulating film GI or the protective film PSV1 is to be formed by plasma CVD (Chemical Vapor Deposition), plasma and electric discharge which may disconnect conductive layers disposed over the substrate, such as the counter voltage signal lines CL and the counter voltage bus line CB2, do not occur between a plasma-generating electrode and the conductive layers.

In the embodiment shown in FIG. 8b, the counter voltage bus line CB2 has a structure made of two stacked layers, i.e., a first part CB2a formed below the gate insulating film GI and a second part CB2b formed between the gate insulating film GI and the protective film PSV1. An opening which reaches the upper face of the first part CB2a is formed in the protective film PSV1 and the gate insulating film GI, while an opening which reaches the upper face of the second part CB2b is formed in the protective film PSV1. The conductive layer CC2 is formed to be in contact with the first part CB2a and the second part CB2b in the respective openings.

Since the counter voltage signal lines CL and the counter voltage bus line CB2 are connected to each other by the conductive layer CC2, there is a possibility that an increase in resistance at a connecting portion may vary the potential supplied from the counter electrode terminal TC2 (refer to FIG. 4). To cancel this local resistance increase in advance, the counter voltage bus line CB2 is formed to have the two-layer structure to the resistance at the connecting portion.

Decreasing the resistance of the counter electrode terminal TC2 is also recommended as a method of effectively canceling an increase in resistance which may occur in a connecting portion of the conductive layer CB2.

Figure 9:
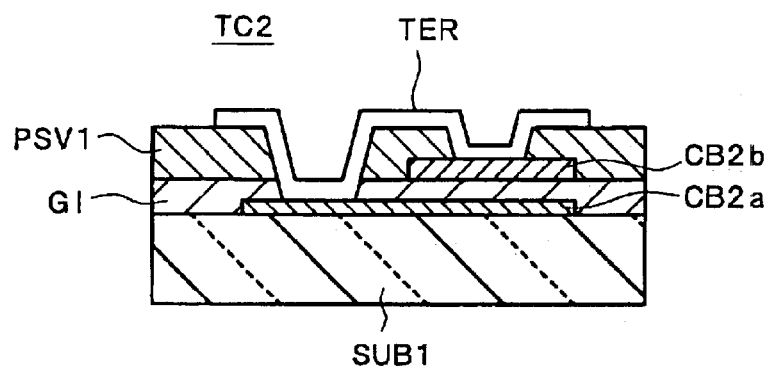
FIG. 9 is a cross-sectional view illustrating the essential portion of an example of a structure which provides electrical connection between a first part and a second part which constitute a counter voltage bus line.

FIG. 9 is a cross-sectional view showing the essential portion of an example of a structure which provides electrical connection between the first part CB2a and the second part CB2b which constitute the counter voltage bus line CB2.

As shown in FIG. 9, a conductive layer TER is in contact with the first part CB2a of the counter voltage bus line CB2 in the opening formed in the gate insulating film GI and the protective film PSV1, and also is in contact with the second part CB2b in the opening formed in the protective film PSV1. The counter electrode terminal TC2 is formed by extending the conductive layer TER to the upper face of the protective film PSV1 between the openings.

A conductive layer SH which extends in a direction transverse to the extension direction of each of the counter voltage signal lines CL is disposed on the protective film PSV1 between the display region AR and the counter voltage bus line CB2, and the conductive layer SH is in contact with the plurality of counter voltage signal lines CL in openings (corresponding to SHC) formed in the protective film PSV1.

This structure makes it possible to correct variations in potential among the counter voltage signal lines CL. The area of the counter voltage bus line CB2 is increased because the counter voltage bus line CB2 adopts the two-layer structure to keep stable the potentials of the counter voltage signal lines CL as described above. However, since the conductive layer SH assists in the operation of the counter voltage bus line CB2, the area of the counter voltage bus line CB2 can be decreased. The adoption of this conductive layer SH is suited for "narrowing a picture frame", i.e., narrowing the periphery of the liquid crystal panel PNL that surrounds the display region AR.

As is apparent from the aforementioned figures, this conductive layer SH is similar to the shield electrode SH used for solving the previously described first subject. In other words, this conductive layer SH also serves the function of the above-described shield electrode.

FIG. 8C shows one example in which the conductive layer SH is adopted. As shown in FIG. 8C, the counter voltage signal line CL is formed in the state of being separated into two parts. Specifically, one of the parts lies between the insulating film GI and the protective film PSV1 in the area between a portion where the counter voltage signal line CL is in contact with the conductive layer CC2 and a portion where the counter voltage signal line CL is in contact with the conductive layer SH. The other part underlies the insulating film GI in a portion where the counter voltage signal line CL extends to the display region AR from the portion where the counter voltage signal line CL is in contact with the conductive layer SH. These separated counter voltage signal lines are electrically connected to each other by contact with the conductive layer SH through an opening formed in the protective film PSV1 and an opening formed in the protective film PSV1 and the gate insulating film GI. The conductive layer SH has a portion formed on the protective film PSV1 between these openings.

This structure more reliably solves the previously described subject, and takes account of the fact that the process conditions of plasma CVD causes more damage to the conductive layers on the substrate than expected. If large quantities of electric charges enter from plasma into the counter voltage signal lines, electric discharge occurs between the ends of the counter voltage signal lines and the counter voltage bus line CB2 spaced part from the ends. Owing to current due to this electric discharge, the counter voltage signal lines are melted and disconnected.

To cope with this problem, during the formation of the insulating film GI, the ends of the counter voltage signal lines CL which extend from the display region AR are spaced apart from the counter voltage bus line CB2, whereas during the formation of the protective film PSV1, the ends of the counter voltage signal lines CL are made closer to the counter voltage bus line CB2, but the portions of the counter voltage signal lines CL that extend into the display region AR are removed (the corresponding counter voltage signal lines CL are formed below the insulating film GI in advance). Thus, the amount of electric charges which flow into the counter voltage signal lines CL can be decreased.

In the embodiment shown in FIG. 8C, the part of the counter voltage signal line CL that lies in the display region AR is disposed below the insulating film GI, and the part of the counter voltage signal line CL that lies on the side of the counter voltage bus line CB2 is disposed between the insulating film GI and the protective film PSV1. However, according to the arrangement of the counter voltage signal lines CL in the display region AR, the relationship in arrangement between the counter voltage signal lines CL disposed in the display region AR and those disposed on the side of the counter voltage bus line CB2 may be reversed.

In the case where the conductive layer SH is adopted, the length, along the extension direction of the clock signal CLK, of the region SHC in which the counter voltage signal line CL is in contact with the conductive layer SH is preferably made half or more of the length of the conductive layer SH along the extension direction of the counter voltage signal line CL. This construction can advantageously decrease the resistance of the conductive layer SH between the counter voltage signal lines CL The ends of the respective counter voltage signal lines CL that are opposite to the counter voltage bus line CB2 may be electrically connected to one another by a second counter voltage bus line CB2' which extends in a direction transverse to the extension direction of each of the counter voltage signal lines CL as shown by a dashed line in FIG. 7. The second counter voltage bus line CB2' is used as the common bus line in the IPS type liquid crystal display device. Since the counter voltage bus line CB2 is used in the present embodiment, the second counter voltage bus line CB2' is not needed, but may also be used for decreasing the resistance between the counter voltage signal lines CL and the counter electrode terminal TC2.

The width of the second counter voltage bus line CB2' can be made smaller than that of the counter voltage bus line CB2 so that the second counter voltage bus line CB2' can be used together with the counter voltage bus line CB2 of the present embodiment. Accordingly, during the deposition of the insulating film GI and the protective film PSV1, even if the second counter voltage bus line CB2' is coupled to the counter voltage signal lines CL, the probability of electric discharge is low and damage to the counter voltage signal lines CL can be ignored (refer to FIG. 7).

The opening CBC2 in the insulating material layers in which the counter voltage bus line CB2 is in contact with the conductive layer CC2 extends along the extension direction of the counter voltage bus line CB2. The length, along the extension direction of the counter voltage signal lines CL, of each of the regions (openings) CLC in which the respective counter voltage signal lines CL are in contact with the conductive layer CC2 has a value larger than the length, along the extension direction of the counter voltage signal lines CL, of the region in which the counter voltage bus line CB2 is in contact with the conductive layer CC2 (i.e., the width of the region transverse to the lengthwise direction thereof) (refer to FIG. 7).

The counter voltage signal lines CL and the counter voltage bus line CB2 are preferably covered with an insulating material layer as completely as possible because the contamination of the liquid crystal layer by the constituent materials of such lines can be prevented. The formation space of the regions (openings) CLC in each of which the counter voltage signal line CL is in contact with the conductive layer CC2 is limited as compared with the region in which the counter voltage bus line CB2 is in contact with the conductive layer CC2, and therefore, each of the regions CLC is preferably made longer than the region CBC2 along the extension direction of the counter voltage signal line CL.

The conductive layer CC2 and the conductive layer SH are formed of an oxide material having conductivity (such as ITO or tin oxide). As described above, the advantage of the oxide material is that there is no risk of contamination of the liquid crystal layer.

Figure 10:
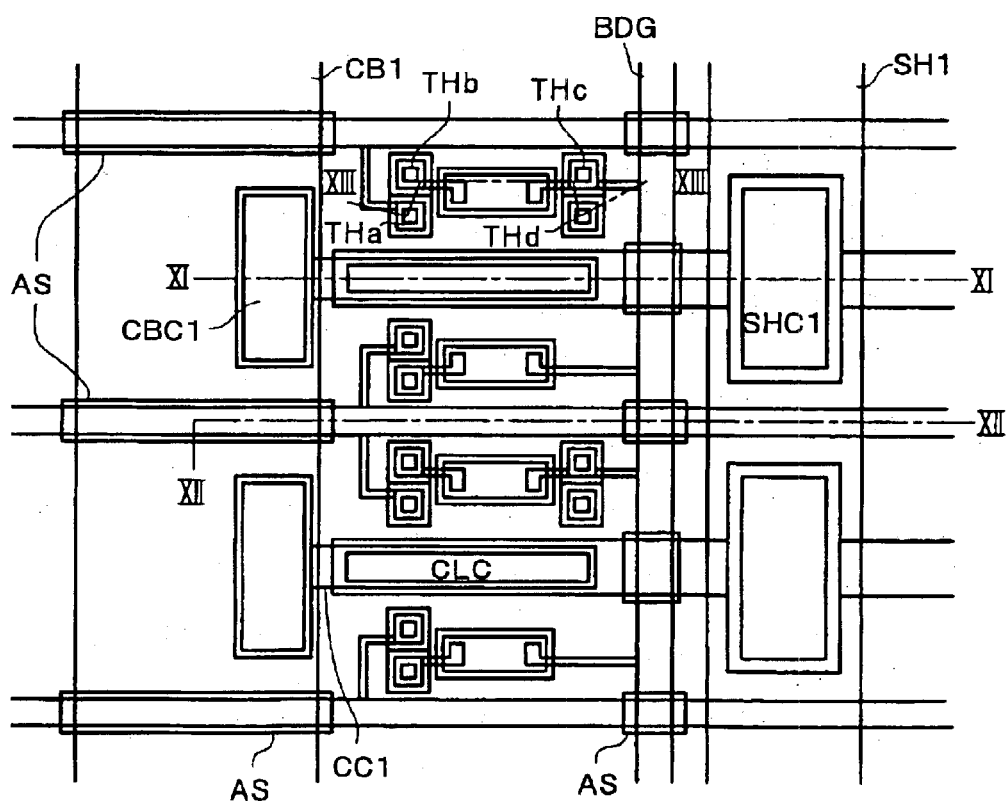
FIG. 10 is a plan view illustrating the essential portion of a second embodiment of the present invention.
Figure 11:
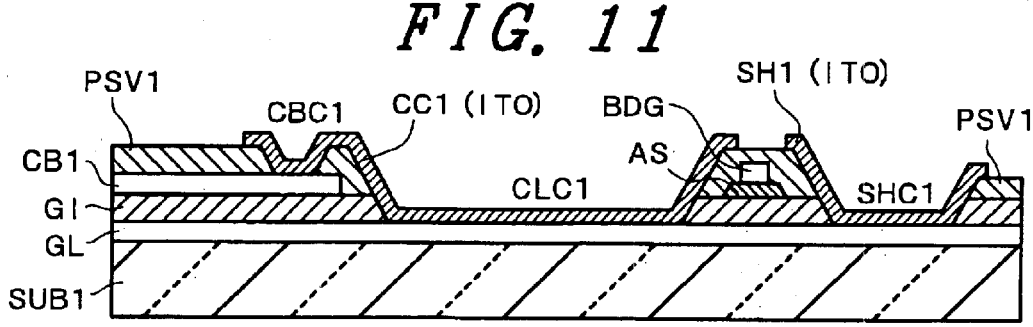
FIG. 11 is a cross-sectional view taken along line XI—XI of FIG. 10.
Figure 12:
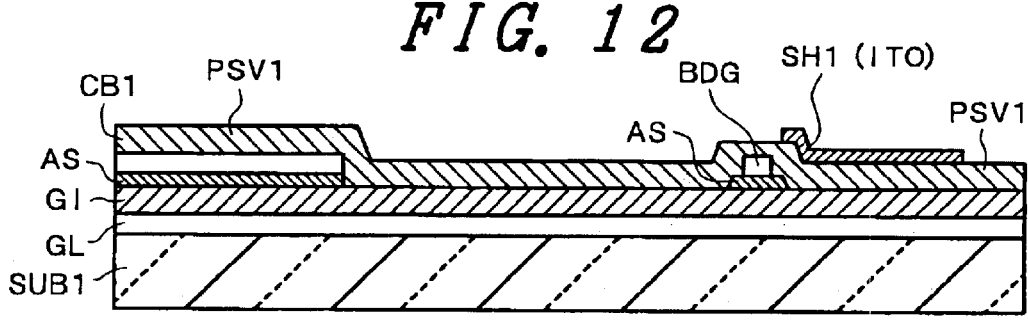
FIG. 12 is a cross-sectional view taken along line XII—XII of FIG. 10.
Figure 13:
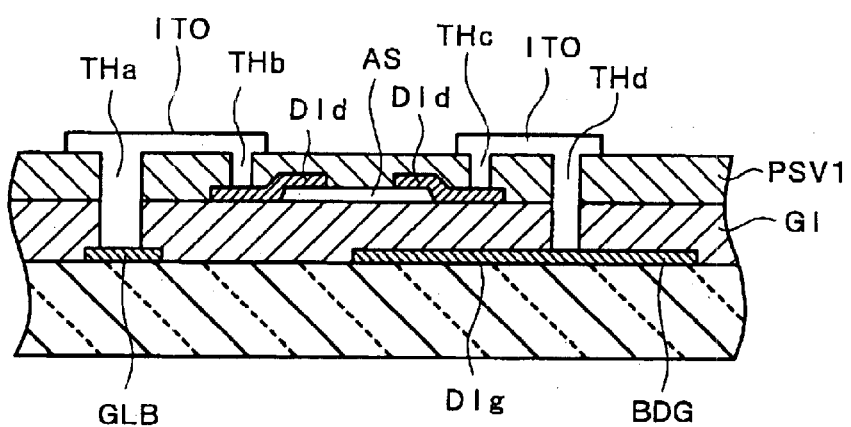
FIG. 13 is a cross-sectional view taken along line XIII—XIII of FIG. 10.

FIG. 10 is a plan view showing the essential portion of a second embodiment of the present invention, in which a construction similar to the above-described embodiment is applied to the counter voltage bus line CB1. FIGS. 11 to 13 are cross-sectional views of the essential portions of the embodiment shown in FIG. 10. FIG. 11 is a cross-sectional view taken along line XI—XI of FIG. 10, FIG. 12 is a cross-sectional view taken along line XII—XII of FIG. 10, and FIG. 13 is a cross-sectional view taken along line XIII—XIII of FIG. 10. In FIG. 10, symbols CB1, CBC1, SH1 and SHC1 correspond to the symbols CB2, CBC2, SH and SHC shown in FIG. 7, respectively. The gate signal lines GL extend to the corresponding gate signal supplying terminals Tg which are positioned at the left-side exterior of FIG. 10 (refer to FIG. 4).

The breakdown (electrostatic breakdown) of the conductive layers due to the above-described electric discharge also occurs in the gate signal lines GL. At the gate signal supplying terminals Tg, since there may occur portions in which the areas of the interconnection layers of the gate signal lines GL are increased, it is desirable to take some measures.

As such measures, protection diodes DG1 such as those shown in FIG. 6 are provided. FIG. 10 shows the plan structure of one of the protection diodes DG1, and FIG. 13 shows the cross-sectional structure of the protection diode DG shown in FIG. 10. One end of the protection diode DG1 is connected to the corresponding gate signal line GL via an interconnection layer GLB, and the other end of the protection diode DG1 is connected to a diode bus line BDG via an interconnection layer D1g.

As shown in FIG. 6, the diode bus line BDG is connected to the other end of each of the protection diodes DG1 disposed on the respective gate signal lines GL, and serves to distribute an abnormal current which occurs in a particular gate signal line among the gate signal lines GL, thereby preventing damage to the particular gate signal line.

The cross section of the protection diode DG1 has an interconnection structure which extends through through-holes THa and THd formed in the insulating film GI and the protective film PSV1 and through-holes THb and THc formed in the protective film PSV1. The cross section of the protection diode DG1 also has a channel formed together with the i-type semiconductor layer AS. The interconnection layers GLB and D1g are formed together with the gate signal lines GL and the like by an identical process, and an interconnection layer Did is formed together with the data signal lines DL and the like by an identical process.

Figure 14:
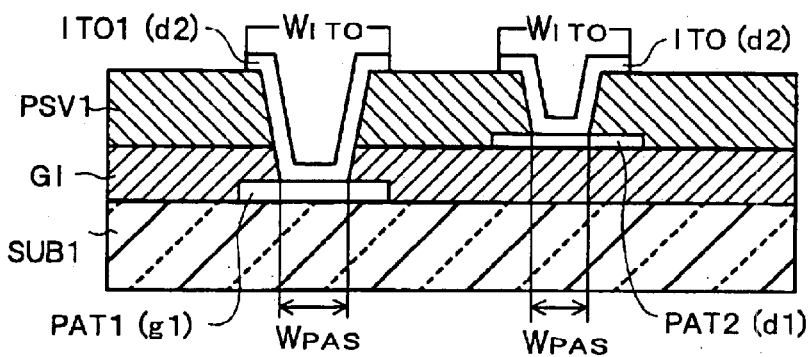
FIG. 14 is a cross-sectional view taken along line XIV—XIV of FIG. 7, showing a third embodiment of the present invention.

FIG. 14 is a cross-sectional view taken along line XIV—XIV of FIG. 7, showing a third embodiment of the present invention. As shown in FIGS. 6 and 7, the liquid crystal display device includes the plurality of gate signal lines GL and the counter voltage signal lines CL all of which extend in a first direction, the plurality of data signal lines DL which extend in a second direction transverse to the first direction, and the pixels each of which is formed according to a region surrounded by two gate signal lines GL or two counter voltage signal lines CL and two data signal lines DL. The gate insulating film GI is formed between the upper portion of each of the gate signal lines GL as well as that of each of the counter voltage signal lines CL and the lower portion of each of the data signal lines DL, and the protective film PSV1 is formed on the upper portion of each of the data signal lines DL. At least one end of each of the gate signal lines GL, the counter voltage signal lines CL and the data signal lines DL extends into the exterior of the display region AR, and is in contact with the conductive layers GP or SH through-the openings formed in the gate insulating film GI and the protective film PSV1 at the exterior of the display region AR. Each of the conductive layers GP and SH has a portion formed on the protective film PSV1. In order to enable process evaluations on these conductive layers GP and SH, as shown in FIGS. 7 and 14, at the exterior of the display region AR, a conductive film PAT1 is formed below the gate insulating film GL and a conductive film PAT2 is formed between the gate insulating film GI and the protective film PSV1. A first opening which reaches the upper face of the conductive film PAT1 is formed in the gate insulating film GI, and the protective film PSV1, while a second opening which reaches the upper face of the conductive film PAT2 is formed in the protective film PSV1, and the first and second openings are spaced apart from each other. A conductive layer ITO1 is formed to extend from the interiors of the first and second openings to the upper portion of the protective film PSV1 which surrounds the first and second openings. The conductive layer ITO1 is formed together with the conductive layers GP and SH by using a conductive material having a higher optical transmissivity than the conductive films PAT1 and PAT2.

In the case where the conductive layers GP and SH are formed of a conductive material having a high optical transmissivity such as ITO, as show in FIG. 14, the formation results (process states) of these conductive layers and the protective film PSV1 can be optically evaluated from the ratio of each of the areas $W_{PAS}$ of the bottoms of the two kinds of openings to the area $W_{PAS}$ of the conductive layer ITO1. In the present embodiment, it is possible to observe each of the areas $W_{PAS}$ through the stacked layer of the conductive film ITO, the protective film PSV1 and the gate insulating film GI.

In addition, the accuracy of the above-described process evaluation is increased because the conductive layer ITO1 formed in the first opening and the conductive layer ITO1 formed in the second opening are spaced part from reach other.

The conductive film PAT1 and the conductive film PAT2 may be formed by the same processes as the gate signal lines GL and the data signal lines DL, respectively. Since a material having a lower optical transmissivity than the conductive layer ITO suffices for the conductive films PAT1 and PAT2, it is not necessary to connect either of the conductive films PAT1 and PAT2 to the gate signal line GL, the data signal line DL or the like. In addition, it is desirable to electrically connect neither of the conductive films PAT1 and PAT2 to these signal lines in order to prevent noise signals from entering the signal lines.

It is recommended that an oxide material having conductivity (such as ITO or tin oxide) be used as the material having a high optical transmissivity, as in the case of the previously described embodiments.

As is apparent from the foregoing description, according to the present invention, in the case where test terminals made of ITO are provided in a liquid crystal sealing region, it is possible to avoid light leaks at pixels positioned at an end of a display region. In addition, it is possible to prevent melting of a counter voltage signal line due to electric discharge with which an insulating film is formed by plasma CVD (Chemical Vapor Deposition) or the like, short-circuiting of adjacent lines and the like. Moreover, disconnection evaluation of each gate line is enabled, whereby a highly reliable liquid crystal display device can be provided.

While we have shown and described several embodiments in accordance with the present invention, it is understood that the sane is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device, comprising:
   a liquid crystal sealing region being formed by sealing a liquid crystal compound in a space being interposed by a first substrate and a second substrate which are disposed so that respective main surfaces of the first substrate and the second substrate are opposite to one another;
   a display region being defined at the liquid crystal sealing region by an opening of a light shielding film which is formed of a material having a lower optical transmissivity than that of at least one of the first substrate and the second substrate on the least one of the first substrate and the second substrate;
   scanning signal lines being formed of a plurality of conductive layers juxtaposed on one of the main surfaces of the first substrate and the second substrate in the liquid crystal sealing region, and being extended from the display region to an exterior of the display region;
   a first insulating layer being formed over the scanning signal lines;
   data signal lines being formed above the first insulating layer in the display region;
   a second insulating layer being formed over the data signal lines; and
   a plurality of pixels being arranged in the display region on the one of the main surfaces of the first substrate and the second substrate, each of the plurality of pixels has a switching element having a semiconductor layer and a pixel electrode in electrical contact with one end of the semiconductor layer, an electric field is applied to the semiconductor layer via the first insulating layer by one of the scanning signal lines and a voltage signal is supplied to another end of the semiconductor layer by one of the data signal lines,
   wherein a terminal is extended on the second insulating layer outside the display region in the liquid crystal sealing region and contacting with the scanning signal lines,
   a first conductive layer is formed between the display region and the terminal on the second insulating layer,
   a second conductive layer being in contact with the first conductive layer through an opening being formed between a neighboring pair of the scanning signal lines,
   an electric potential of the first conductive layer is different from an electric potential of the scanning signal lines, the second conductive layer is electrically connected with a counter electrode generating an electric field to be applied to the liquid crystal compound between the counter electrode and the pixel electrode, the scanning signal lines have a portion thereof bending with respect to a first extension direction of the scanning signal lines from the display region and extending in a second extension direction which makes a predetermined angle to the first extension direction, between a position at which the scanning signal lines cross the first conductive layer and another position at which the scanning signal lines are in contact with the terminal, and the scanning signal lines have another portion extended along the first extension direction from an end of the display region being opposite to the terminal to a position at which the portion of the scanning signal lines veer in the second extension direction, and a length of the another portion of the scanning signal lines along the first extension direction is four times as long as a pixel length of the pixels along the extension direction of the scanning signal lines or longer than the pixel length.

2. The liquid crystal display device according to claim 1, wherein:

the terminal and an end of the display region opposite the terminal are disposed so as to be spaced from one another with a distance which is four times as long as a pixel length of the pixels along the extension direction of the scanning signal lines or longer than the pixel length.

3. A liquid crystal display device, comprising:

a liquid crystal sealing region being formed by sealing a liquid crystal compound in a space being interposed by a first substrate and a second substrate which are disposed so that respective main surfaces of the first substrate and the second substrate are opposite to one another, a display region being defined at the liquid crystal sealing region by an opening of a light shielding film which is formed of a material having a lower optical transmissivity than that of at least one of the first substrate and the second substrate on the least one of the first substrate and the second substrate;

a plurality of first conductive layers being juxtaposed on one of the main surfaces of the first substrate and the second substrate in the liquid crystal sealing region and being extended from the display region to an exterior of the display region;

a first insulating layer being formed on the one of the main surfaces of the first substrate and the second substrate;

a second insulating layer being formed over the first insulating layer and the first conductive layers;

a second conductive layer having a first portion being formed under the first insulating layer and a second portion being formed between the first insulating layer and the second insulating layer both of which are extended in a direction transverse to an extension direction of the first conductive layers at the exterior of the display region and are spaced from the first conductive layers; and a third conductive layer having a portion which is formed on the second insulating layer and has electrical contacts with the first conductive layers and the second conductive layer outside the display region respectively, wherein the third conductive layer is in electrical contact with the first portion of the second conductive layer through a first opening formed at the first insulating layer and the second insulating layer and is in electrical contact with the second portion of the second conductive layer through second opening being formed at the second insulating layer.

4. The liquid crystal display device according to claim 3, wherein:

a terminal is provided for the second conductive layer; and the terminal for the second conductive layer is formed of a conductive material being in electrical contact with the first portion of the second conductive layer through an opening formed at the first insulating layer and the second insulating layer and being also in electrical contact with the second portion of the second conductive layer through another opening being formed at the second insulating layer.

5. The liquid crystal display device according to claim 3, wherein:

a fourth conductive layer extending in a direction transverse to the extension direction of the first conductive layers is provided on the second insulating layer in an area between the display region and the second conductive layer, and the fourth conductive layer is in electrical contact with the plurality of first conductive layers through respective openings being formed at the second insulating layer.

6. The liquid crystal display device according to claim 5, wherein:

a region where the fourth conductive layer is in contact with the first conductive layers has a length along the extension direction of the first conductive layers being half as long as a length of the fourth conductive layer along the extension direction of the first conductive layers or longer than the length of the fourth conductive layer.

7. The liquid crystal display device according to claim 5, wherein:

respective ends of the plurality of first conductive layers being opposite to the second conductive layer are electrically connected to each other by a conductive layer being extended in a direction transverse to the extension direction of the first conductive layers.

8. The liquid crystal display device according to claim 7, wherein:

the conductive layer being connected to the ends of the plurality of first conductive layers has a length along an extension direction of one of the first conductive layers being smaller than a length of the second conductive layer along the extension direction of the one of the first conductive layers.

9. The liquid crystal display device according to claim 8, wherein:

an opening of the insulating layer through which the second conductive layer and the third conductive layer contact with one another is extended along an extension direction of the fourth conductive layer extending in a direction transverse to an extension direction of the second conductive layer, and an area where the first conductive layers and the third conductive layer contact with one another has a length along the extension direction of the first conductive layers being greater than a length of an area where the second conductive layer and the third conductive layer contact with one another along the extension direction of the first conductive layers.

10. The liquid crystal display device according to claim 5, wherein:
the third conductive layer and the fourth conductive layer are formed of an oxide material.

11. The liquid crystal display device, according to claim 10, wherein:
the oxide material is selected from the group consisting of ITO (Indium-Tin-Oxide) and $SnO_2$.

* * * * *